United States Patent [19]

Ishii

[11] Patent Number: 5,697,568
[45] Date of Patent: Dec. 16, 1997

[54] REEL HOLDER BRAKE DEVICE

[75] Inventor: Masami Ishii, Kanagawa, Japan

[73] Assignee: Sony Corporation, Tokyo, Japan

[21] Appl. No.: 627,014

[22] Filed: Apr. 3, 1996

[30] Foreign Application Priority Data

Apr. 7, 1995 [JP] Japan .................. P07-082592

[51] Int. Cl.$^6$ .................................................. G11B 15/46
[52] U.S. Cl. ....................... 242/334.6; 242/355.1; 360/95
[58] Field of Search ................... 242/334.6, 355.1; 360/95

[56] References Cited

U.S. PATENT DOCUMENTS

| | | | |
|---|---|---|---|
| 3,911,492 | 10/1975 | Ura | 242/355.1 X |
| 4,642,712 | 2/1987 | Kohda | 360/95 X |
| 4,652,948 | 3/1987 | Umeda | 360/95 |
| 5,188,311 | 2/1993 | Choi | 242/355.1 |
| 5,262,909 | 11/1993 | Chiou et al. | 360/95 X |
| 5,299,076 | 3/1994 | Park | 360/95 X |
| 5,333,807 | 8/1994 | Maehara et al. | 242/334.6 |
| 5,335,877 | 8/1994 | Sawai et al. | 242/334.6 |
| 5,548,456 | 8/1996 | Jin | 360/95 X |
| 5,605,300 | 2/1997 | Uetake et al. | 242/334.6 X |

Primary Examiner—Daniel P. Stodola
Assistant Examiner—William A. Rivera
Attorney, Agent, or Firm—Jay H. Maioli

[57] ABSTRACT

In a tape driving system having both a tape reel holder which puts thereon a tape reel and a tape drawing arm which leads a part of the tape from the tape reel to a given portion, there is installed a reel holder brake device. The device has a brake band having a major portion operatively put around the reel holder. A tension regulator arm is pivotal about a pivoted portion thereof between the loading and unloading positions. The tension regulator arm has the given portion. A spring biases the tension regulator arm to pivot toward the unloading position. A drive gear drives the tape drawing arm when rotated. The drive gear has in one surface thereof a cam groove. A first pivotal arm has one end pivotally connected to one end of the brake band and the other end equipped with a follower pin slidably engaged with the cam groove. A second pivotal arm has one end pivotally connected to the tension regulator arm and the other end pivotally connected to the other end of the brake band. With this arrangement, the reel holder brake device can apply the reel holder with two types (viz., smaller and larger) of brake torque.

13 Claims, 6 Drawing Sheets

REEL HOLDER BRAKE DEVICE

BACKGROUND OF THE INVENTION

1. Field of the invention

The present invention relates in general to brake devices and more particularly to brake devices employed in a magnetic recording and playback device. More specifically, the present invention is concerned with a reel holder brake device employed in a camera-mounted video tape recorder or the like.

2. Description of Prior art

For ease of description, in the following description, a camera-mounted video tape recorder will be referred to as a video camera and a capstan for mounting thereon a tape reel will be referred to as a reel holder.

Hitherto, for threading or loading a tape in the mechanism of a video tape recorder the, so-called "U-loading method" and "M-loading method" are known. Of these methods, the M-loading method has been widely used due to simplicity in construction of the mechanism.

In the video tape recorders of the above-mentioned type, a reel holder brake device is employed for applying the tape with a suitable tension in each operation mode of the recorder.

Usually, the reel holder brake device comprises a soft brake mechanism having a brake shoe which can be pressed against a reel holder and a tension regulator mechanism having a brake band which is put around the reel holder. That is, the soft brake mechanism operates to brake the reel holder with a smaller braking force in a tape loading mode and fast forward/return modes, while, the tension regular mechanism operates to brake the reel holder with a larger braking force in the recording and playback modes.

However, in the conventional reel holder brake devices of the above-mentioned type, usage of both the soft brake mechanism and the tension regulator mechanism inevitably causes an increase in the number of parts, complication in construction and increase in production cost. Furthermore, usage of the two mechanisms needs a correspondingly larger mounting space therefore, which causes a bulky construction of the video tape recorder. Furthermore, usage of the brake shoe by the soft brake mechanism needs a periodic change of the shoe, which induces increase in maintenance cost. Furthermore, due to the nature of the soft brake mechanism, it is difficult to obtain a stable brake torque therefrom.

SUMMARY OF THE INVENTION

It is therefore an essential object of the present invention to provide a reel holder brake device for a video tape recorder, which is free of the above-mentioned drawbacks.

That is, according to the present invention, there is provided a reel holder brake device for a video tape recorder, which is simple and compact in construction, low in maintenance cost and obtains a stable brake torque.

According to the present invention, there is provided a reel holder brake device for use in a tape driving system having both a tape reel holder which puts thereon a tape reel and a tape drawing arm which leads a part of the tape from the tape reel to a given portion. The reel holder brake device comprises a brake band having a major portion operatively put around the reel holder and first and second ends; a tension regulator arm pivotal about a pivoted portion thereof between the loading and unloading positions, the tension regulator arm having the given portion a; biasing means for biasing the tension regulator arm to pivot toward the unloading position; a drive gear for driving the tape drawing arm when rotated, the drive gear having on one surface thereof a cam groove; a first pivotal arm having one end pivotally connected to the first end of the brake band and the other end equipped with a follower pin slidably engaged with the cam groove; and a second pivotal arm having one end pivotally connected to the tension regulator arm and the other end pivotally connected to the second end of the brake band.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 4:
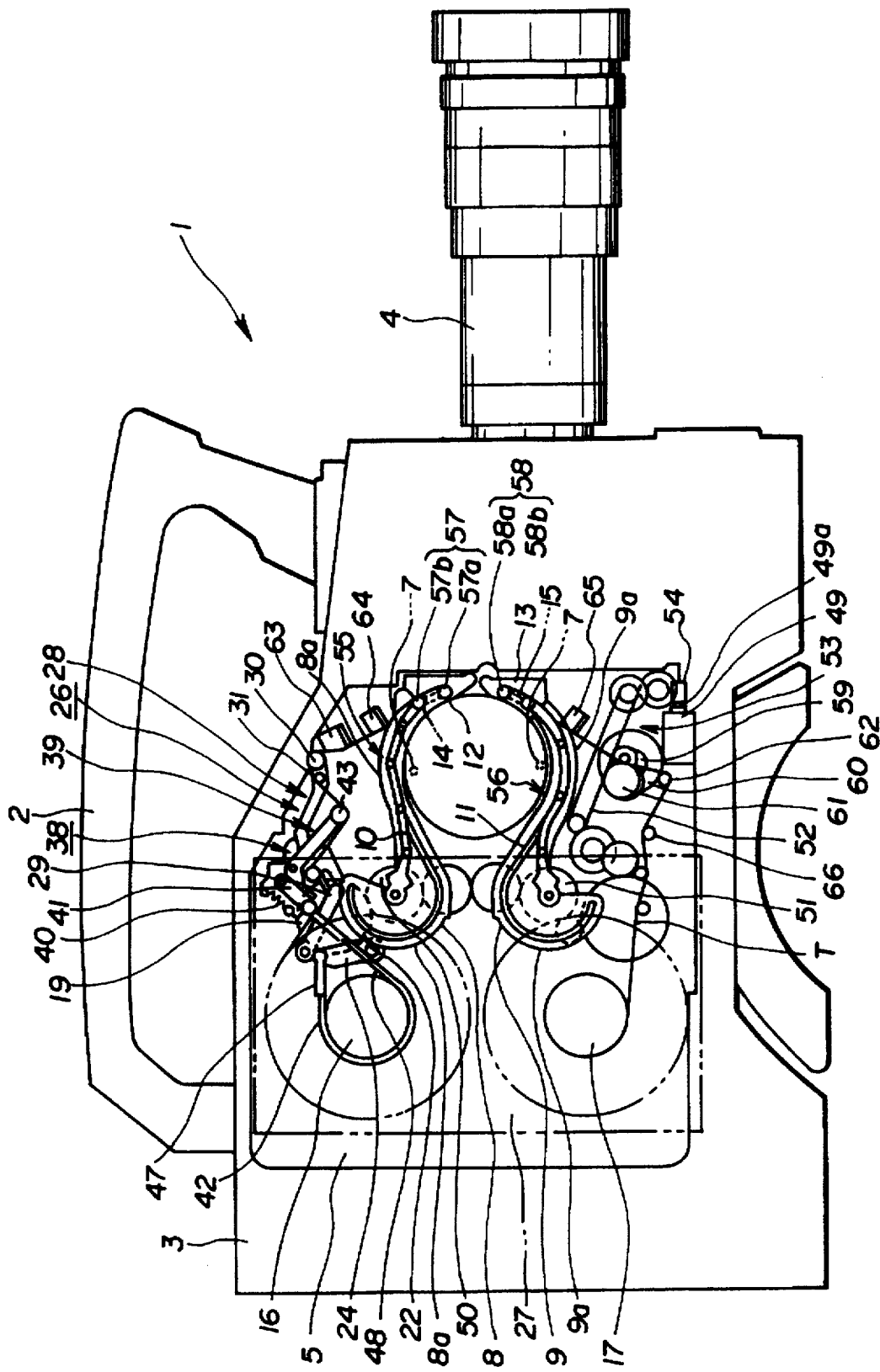
FIG. 4 is a partially cut side view of the video camera to which the reel holder brake device of the invention is practically applied.

Referring to FIG. 4 of the drawings, there is shown a handy video camera 1 to which the present invention is practically applied.

The camera 1 shown comprises a camera proper 3, a hand hold 2 attached to an upper portion of the camera proper 3 and a lens barrel 4 detachably connected to a front portion of the camera proper 3.

The camera proper 3 has therein an optical mechanism (not shown) which includes an image sensing element. The lens barrel 4 has a plurality of lenses installed therein.

Designated by numeral 5 is a chassis for a video tape recorder, which is mounted in the camera proper 3 behind the optical mechanism. Designated by numeral 6 is a head drum having rotary heads 7, which is arranged on the chassis 5 at a position near the optical mechanism.

Figure 1:
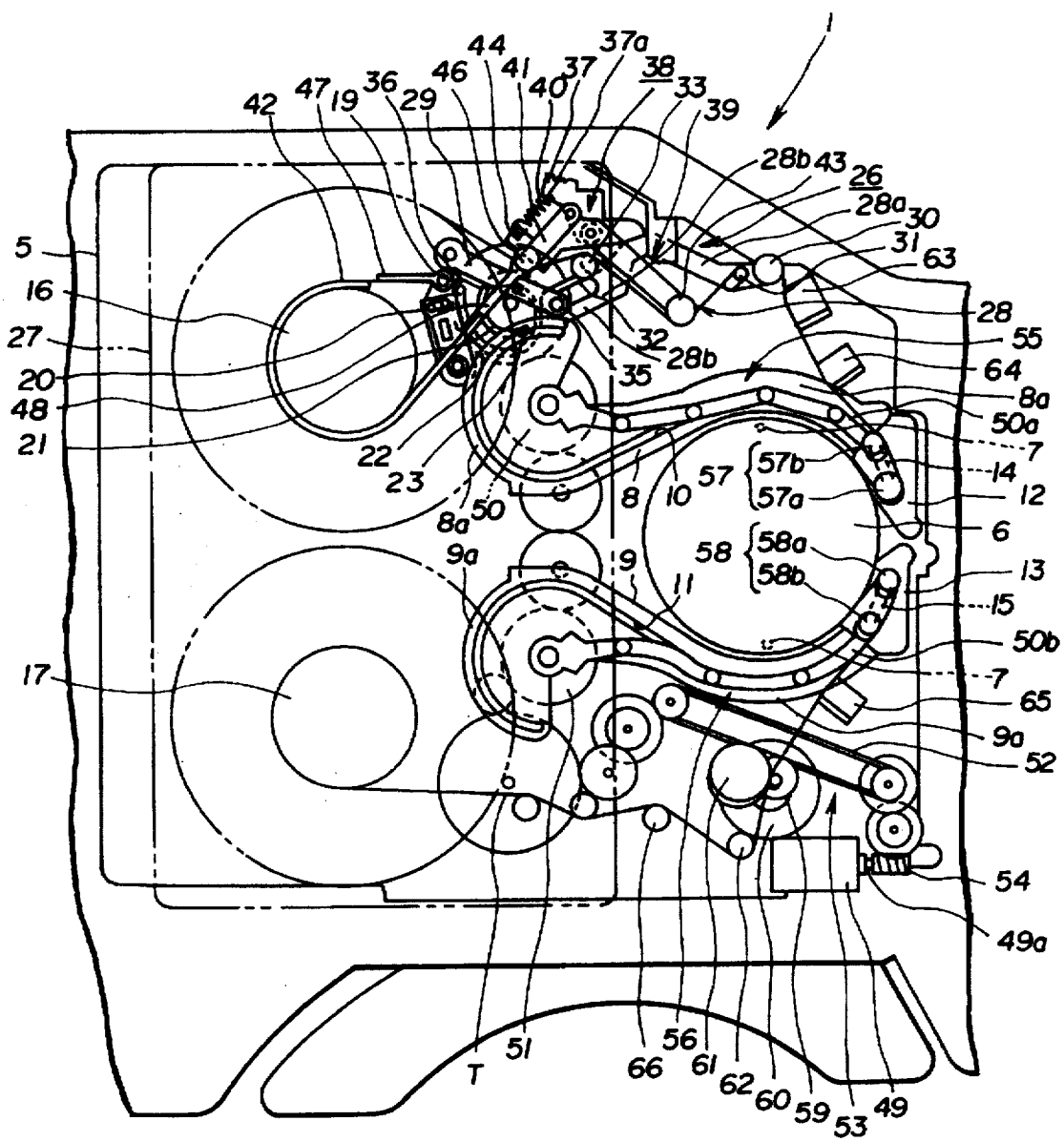
FIG. 1 is a view showing a mechanism of a portable video camera to which a reel holder brake device of the present invention is practically applied.

In FIG. 1, designated by numerals 8 and 9 are a first guide rail and a second guide rail, each having a guide groove 10 or 11. These guide rails 8 and 9 are mounted to the chassis 5. As shown, each guide rail 8 or 9 is in the form of the letter "S" with curved portions 8a and 8a' or 9a and 9a'. These two guide rails 8 and 9 are symmetrically arranged to surround the head drum 6 with their larger curved portions 8a' and 9a'.

Designated by numerals 12 and 13 are first and second guide blocks which have respective guide grooves 14 and 15 which are communicated with the guide grooves 10 and 11 of the guide rails 8 and 9. As shown, these guide blocks 12 and 13 are mounted to the chassis 5 at a position remote from a tape cassette setting position (viz., the position denoted by numeral 27) and connected to leading ends of the guide rails 8 and 9.

Designated by numerals 16 and 17 are a tape supply reel holder (or capstan) and a tape takeup reel holder (or capstan)

which are rotatably arranged on the chassis 5. As shown, these reel holders 16 and 17 are located at the tape cassette setting position and arranged to rotate the respective reels (not shown) of a tape cassette 27 when the cassette is properly set in the tape cassette setting position.

Figure 2:
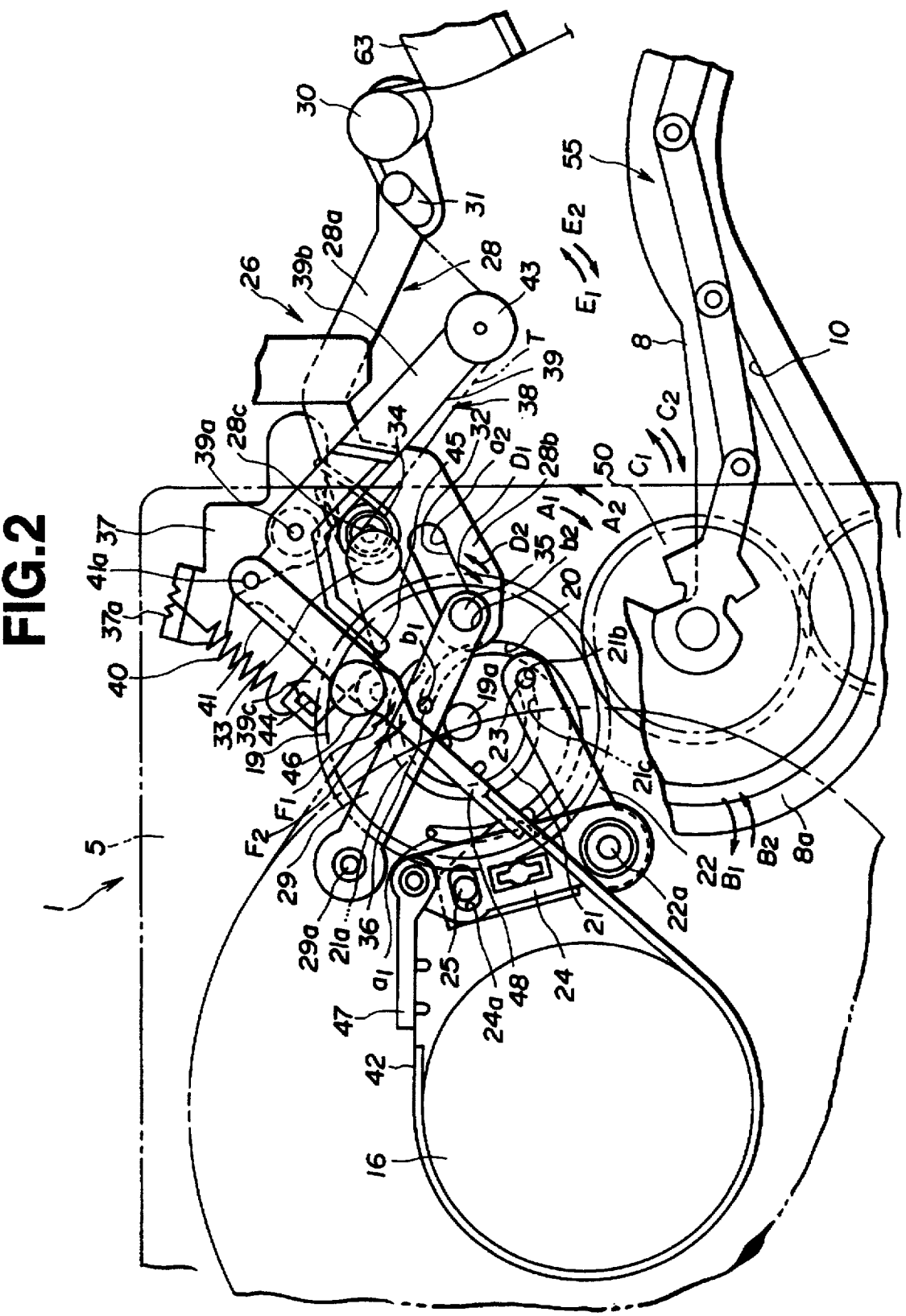
FIG. 2 is an enlarged view showing a part of the mechanism of the video camera in a condition wherein a tape loading is completed.

In FIG. 2, designated by numeral 19 is a drive gear which is formed at one face thereof with both a first and second cam grooves 20 and 21. As will become apparent as the description proceeds, the first cam groove 20 is used for pivoting a tape drawing plate 29, and the second cam groove 21 is used for pivoting a first pivotal arm 22. The drive gear 19 is rotatably mounted on the chassis 5 through a rotation shaft 19a.

Of the two cam grooves 20 and 21, the first cam groove 20 is a helical groove having an outer end a1 near the periphery of the drive gear 19 and an inner end b1 near the center of the drive gear 19. While, the second cam groove 21 is an arcuate groove including a first arcuate portion 21a which coaxially extends around the rotation shaft 19a and has one terminal end located outside the first cam groove 20, a smaller second arcuate portion 21b which has a larger radius of curvature than the first arcuate portion 21a and has the other terminal end located inside the first cam groove 20, and a third arcuate portion 21c which connects the first and second arcuate portions 21a and 21b.

The first pivotal arm 22 is in the shape of the letter "L", which is pivotally mounted on the chassis 5 through a pivot shaft 22a.

One arm part of the first pivotal arm 22 has at a leading end thereof a follower pin 23 which is slidably engaged with the second cam groove 21 of the drive gear 19.

Thus, when the drive gear 19 rotates, the first pivotal arm 22 can pivot between the first and second angular positions. That is, the first angular position is taken when the follower pin 23 is in the first arcuate portion 21a and the second angular position is taken when the follower pin 23 is in the smaller second arcuate portion 21b. In fact, the first angular position is assumed when a tape-loading is not established or a tape-unloading is being carried out. While, the second angular position is assumed when the tape-loading is established.

The other arm part of the first pivotal arm 22 has at a leading end thereof a stopper pin 25 secured thereto. Mounted on the other arm part is a position adjusting plate 24 which has one end pivotally disposed about the pivot shaft 22a. A free end portion of the position adjusting plate 24 is formed with an arcuate slot 24a in which the stopper pin 25 is received. A fastening screw (no numeral) is used for fixing the position adjusting plate 24 to the other arm part. That is, when the fastening screw is tightened, the adjusting plate 24 is fixed to the other arm part of the first pivotal arm 22 to pivot therewith about the pivot shaft 22a. While, when the fastening screw is loosened, the adjusting plate 24 is permitted to pivot relative 10 to the other arm part of the first pivotal arm 22.

As will become apparent as the description proceeds, the position adjusting plate 24 adjusts the position of a tension regulator arm 39, and the stopper pin 25 limits the pivot movement of the position adjusting plate 24 relative to the other arm part of the first pivotal arm 22.

Referring back to FIG. 1, denoted by numeral 26 is a tape drawing mechanism which functions to draw a magnetic tape T from the tape cassette 27 toward a tape loading position, that is, toward the head drum 6. The tape drawing mechanism 26 is mounted on the chassis 5 above the head drum 6 and comprises generally a tape drawing arm 28 and a tape drawing plate 29.

As is best shown in FIG. 2, the tape drawing arm 28 is pivotally mounted on the chassis 5 through a pivot shaft 28c and comprises a generally Z-shaped first arm part 28a which has at a leading end thereof both a first guide roller 30 and a guide pin 31 for guiding the tape T, and a generally L-shaped second arm part 28b which has a longitudinally extending slot 32.

The tape drawing arm 28 is equipped near the pivot shaft 28c thereof with a guide roller 33 for guiding the tape T. A torsion spring 34 is disposed about the pivot shaft 28c to constantly bias the tape drawing arm 28 in a clockwise direction in FIG. 2, that is, in a direction not to draw out the tape T.

The slot 32 of the tape drawing arm 28 is a generally L-shaped slot having two rounded ends $a_2$ and $b_2$.

The tape drawing plate 29 of the tape drawing mechanism 26 is pivotally mounted on the chassis 5 through a pivot shaft 29a.

A free end of the tape drawing plate 29 is equipped with a press roller 35 which is rotatably received in the slot 32 of the tape drawing arm 28. A middle portion of the tape drawing plate 29 is equipped with a follower pin 36 which is slidably engaged with the first cam groove 20 of the drive gear 19.

Designated by numeral 37 is a bearing holder which is formed with a spring holding edge 37a. The bearing holder 37 is secured to the chassis 5 near the pivoted portion 28c of the tape drawing arm 28.

Figure 3:
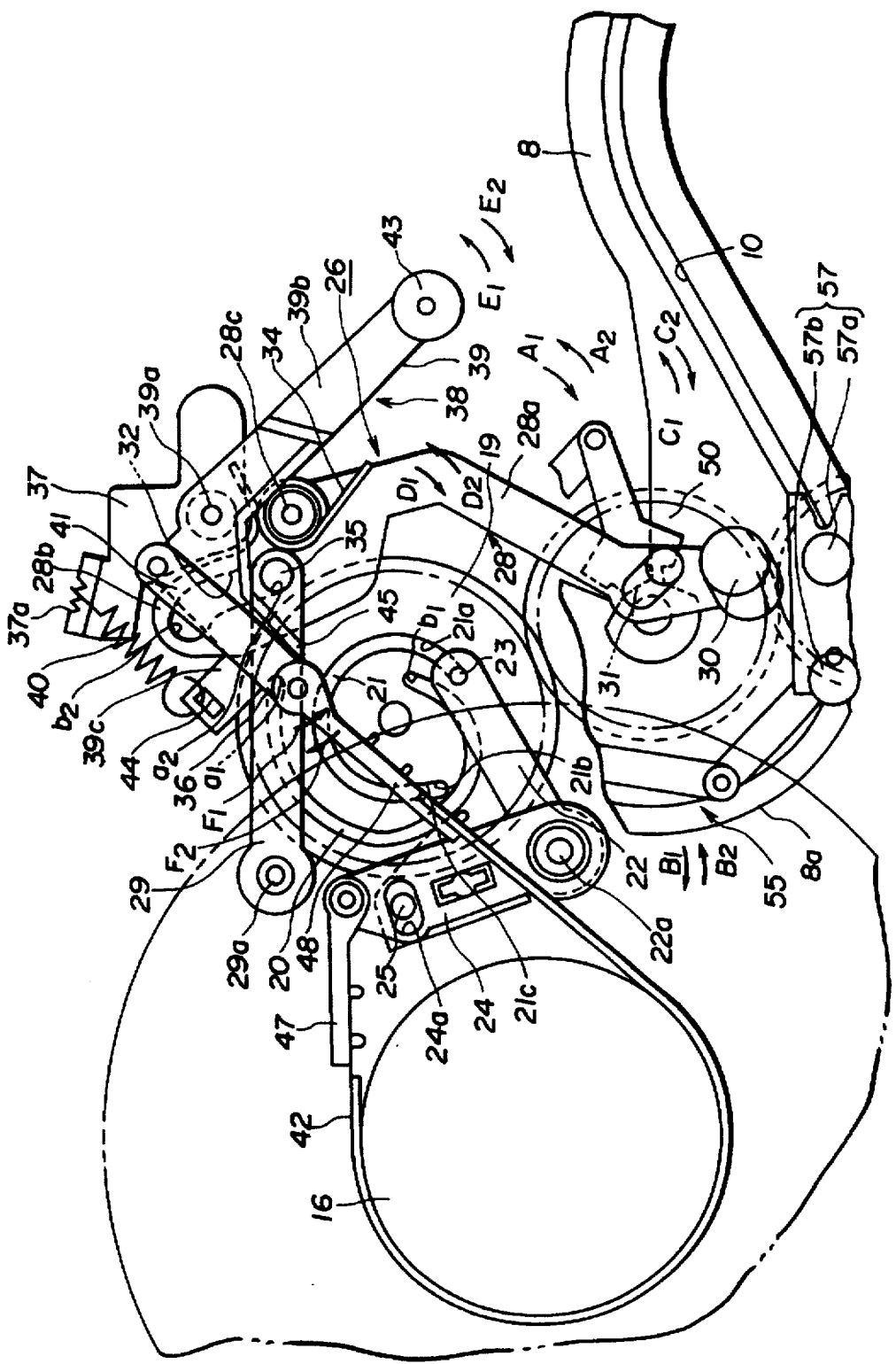
FIG. 3 is a view similar to FIG. 2, but showing the mechanism in a tape unloading condition.

In FIG. 3, designated by numeral 38 is a tension regulator mechanism which can regulate or adjust a tension applied to the magnetic tape T.

The tension regulator mechanism 38 is mounted on the chassis 5 and comprises a tension regulator arm 39 which can pivot about a pivot shaft 39a between a loading position and an unloading position (initial position), a coil spring 40 which biases the tension regulator arm 39 toward the unloading position, a second pivotal arm 41 which is pivotally connected to the tension regulator arm 39, and a brake band 42 which has one end pivotally connected to the second pivotal arm 41 and the other end pivotally connected to the above-mentioned position adjusting plate 24.

More specifically, the tension regulator arm 39 is pivotally connected to the bearing holder 37 through the pivot shaft 39a and comprises an elongated first arm part 39b which is equipped at its leading end with a tape guide roller 43 and a generally L-shaped arm part 39c which is formed at a free end thereof with a spring engaging opening 44. The tape guide roller 43 functions to guide the tape T which has been drawn out by the tape drawing arm 28.

The tension regulator arm 39 is formed with an arm actuating portion 45. That is, when, under the tape unloading condition, the drive gear 19 is rotated in an unloading direction, that is, in a counterclockwise direction in the drawing, the arm actuating portion 45 pushes the second pivotal arm 41 in such a direction as to move the band connecting portion of the arm 41 away from the pivot shaft 39a.

The coil spring 40 has both ends respectively hooked to the spring holding edge 37a of the bearing holder 37 and the spring engaging opening 44 of the tension regulator arm 39.

The second pivotal arm 41 is pivotally connected through a pivot shaft 41a to the tension regulator arm 39. The second pivotal arm 41 is equipped near the band connecting portion with a tape guide roller 46 (see FIG. 2).

As shown in the drawings, the brake band 42 has a major portion operatively put around the tape supply reel holder 16. The ends of the brake band 42 are pivotally connected to the position adjusting plate 24 and the second pivotal arm 41 respectively through connecting pieces 47 and 48.

In FIG. 1, designated by numeral 49 is an electric motor producing a power for loading and unloading the tape T, which is mounted on the chassis 5 below the head drum 6.

An output shaft 49a of the motor 49 is equipped with a worm gear 54 which is operatively connected to the drive gear 19 through a speed reduction mechanism 53 which comprises a loading gear 50, an unloading gear 51 and a power transmission belt 52.

Designated by numerals 55 and 56 in FIG. 1 are first and second link mechanisms which are constructed to effect the tape loading and unloading. These mechanisms 55 and 56 are incorporated with the above-mentioned loading and unloading gears 50 and 51. To respective leading links 50a and 51a of the mechanisms 55 and 56, there are connected first and second sliders 57 and 58. Each slider 57 or 58 is equipped with two tape guides 57a and 57b, or 58a and 58b by which the tape T is guided.

Each slider 57 or 58 is moved in and along the guide groove 10 or 11 of the guide rail 8 or 9 and the guide groove 14 or 15 of the guide block 12 or 13 between a loading position and an unloading position. In the loading position, the first and second sliders 57 and 58 assume their frontmost (or rightmost) positions as shown in FIG. 1 putting the tape T on the head drum 6. While, in the unloading position, the first and second sliders 57 and 58 assume their rearmost (or leftmost) positions separating the tape T from the head drum 6.

Designated by numeral 59 is a capstan shaft driven by a capstan motor 60. 61 is a pinch roller which presses the tape T against the capstan shaft 59. 62 is a second guide roller which, under the tape loading condition, draws out the tape T from the tape cassette 27 toward the tape loading position with the aid of a tape drawing arm (not shown). Designated by numerals 63, 64 and 65 are fixed heads and 66 is a fixed guide.

Figure 5:
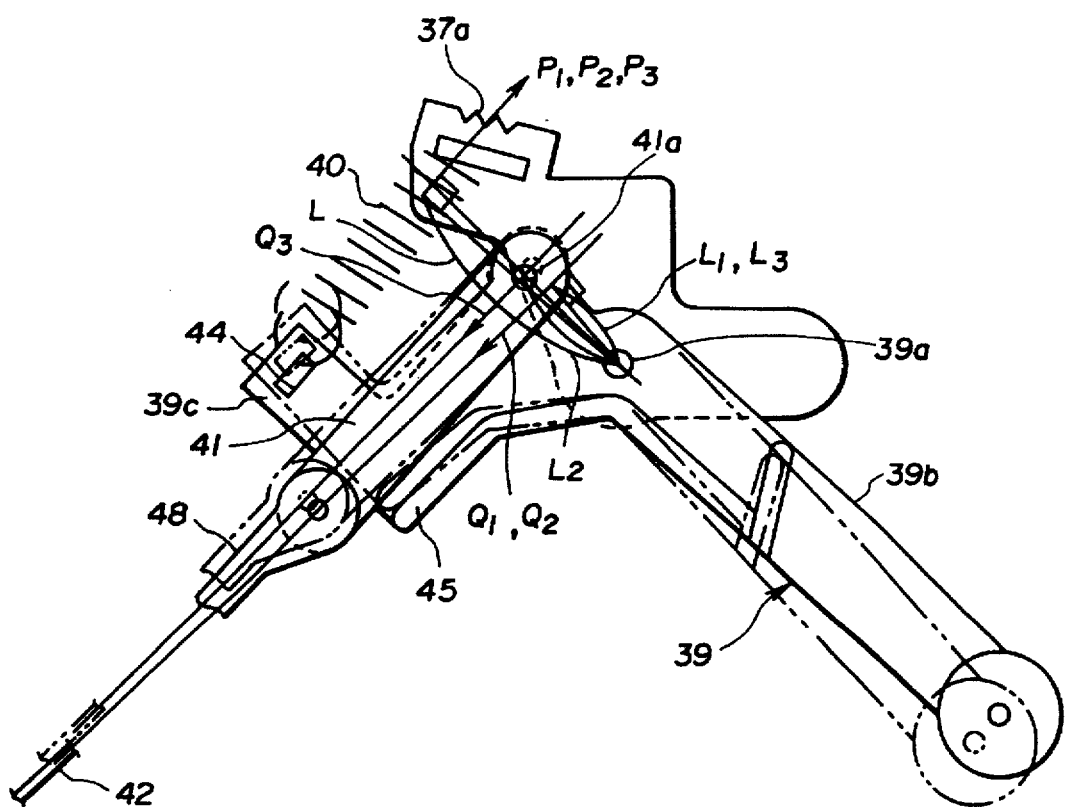
FIG. 5 is an illustration for explaining various tensions applicable to a brake band employed in the reel holder brake device of the invention.

As is seen from FIGS. 2 and 3, the drive gear 19 rotates in both clockwise ($A_1$) and counterclockwise ($A_2$) directions, the first pivotal arm 22 pivots in both clockwise ($B_1$) and counterclockwise ($B_2$) directions, the tape drawing arm 28 pivots in both clockwise ($C_1$) and counterclockwise ($C_2$) directions, the tape drawing plate 29 pivots in both clockwise ($D_1$) and counterclockwise ($D_2$) directions, the tension regulator arm 39 pivots in both clockwise ($E_1$) and counterclockwise ($E_2$) directions and the second pivotal arm 41 pivots in both clockwise ($F_1$) and counterclockwise ($F_2$) directions. In FIG. 5, there is shown an illustration depicting the manner in which the brake band 42 is applied with a tension. In the illustration, reference L denotes the length component of a moment which is applied to pivot shaft 39a due to the biasing force of the coil spring 40. Reference $L_1$, $L_2$ or $L_3$ denotes the length component of a moment which is applied to the pivot shaft 39a due to the tension of the brake band 42, reference $P_1$, $P_2$ or $P_3$ denotes the biasing force of the coil spring 40, and reference Q1, Q2 or Q3 denotes the tension of the brake band 42.

In the following, operation will be described with reference to FIGS. 2, 3 and 4. First, description of a tape loading will be made.

When, as will be understood from FIG. 4, the tape cassette 27 is put into a cassette pocket (not shown) of the video camera 1, the cassette 27 is automatically led into the tape cassette setting position. Upon this, the motor 49 is energized to actuate both the first and second sliders 57 and 58 through the worm gear 54 and the speed reduction mechanism 53. That is, due to energization of the motor 49, the first and second sliders 57 and 58 convey a part of the magnetic tape T forwardly from the tape cassette 27 toward the first and second guide blocks 12 and 13 while running in and along the first and second guide rails 8 and 9 respectively. During this, the conveyed part of the tape T is helically put around the head drum 6 with a given contact angle with respect thereto.

During this operation, the first and second guide rollers 30 and 62 move from the interior of the tape cassette 27 toward their tape loading positions defined above and below the head drum 6. With this, an in-coming part of the tape T with respect to the head drum 6 is put on the fixed heads 63 and 64 which are erase heads or the like, while, an out-going part of the tape T with respect to the head drum 6 is put on the other fixed head 65 which is a recording/pick-up head. That is, the in-coming part is a part of the tape T which extends from the first guide roller 30 to the tape guide 57b of the first slider 57, while the out-going part is a part of the tape T which extends from tape guide 58b of the second slider 58 to the fixed guide 66.

When, under this condition, the drive gear 19 (see FIG. 3) is rotated clockwise in the direction of the arrow $A_1$ due to rotation of the electric motor 49 in the loading direction, the follower pin 36 of the tape drawing plate 29 is moved in the first cam groove 20 of the drive gear 19 from the outer end a1 toward the inner end b1, and at the same time, the press roller 35 of the tape drawing plate 29 is moved in the slot 32 of the tape drawing arm 28 from the end a2 toward the other end b2.

During this, the follower pin 23 of the first pivotal arm 22 is moved in the first arcuate groove portion 21a of the second cam groove 21.

Thus, the tape drawing plate 29 is pivoted about the pivot shaft 29a in the direction of the arrow $D_1$ in FIG. 3, and at the same time, the tape drawing arm 28 is pivoted about the pivot shaft 28c in the direction of the arrow $C_1$ thereby leading or putting the in-coming part of the tape T to or on the guide roller 43 of the tension regulator arm 39. With this, the tape T is applied with a back tension in the tape loading mode.

During the above operation, the first pivotal arm 22 is kept unmoved because the first arcuate groove portion 21a is concentric with the pivot shaft 19a.

Due to the continuous operation of the electric motor 49, the first and second sliders 57 and 58 (see FIG. 1) are finally moved to terminal ends of the guide grooves 14 and 15 of the first and second guide blocks 12 and 13.

In this condition, due to continuous operation of the electric motor 49, the drive gear 19 is further rotated in the direction of the arrow $A_1$, so that, as is seen from FIG. 2, the follower pin 36 of the tape drawing plate 29 is moved to the inner end b1 of the first cam groove 20 of the drive gear 19 and the press roller 35 of the tape drawing plate 29 is moved to the end b2 of the slot 32 of the tape drawing arm 28.

At the same time, the follower pin 23 of the first pivotal arm 22 is moved in the second cam groove 21 from the first arcuate groove portion 21a to the smaller second arcuate groove portion 21b through the third arcuate groove portion 21c.

Thus, as is seen from FIG. 2, the tape drawing plate 29 is pivoted about the pivot shaft 29a to its loading position, and at the same time, the tape drawing arm 28 is pivoted about the pivot shaft 28c to its loading position against the force of the torsion spring 34.

Since the first pivotal arm 22 is pivoted about the pivot shaft 22a in the direction of the arrow $B_1$ in FIG. 2, the tension regulator arm 39 is pivoted about the pivot shaft 39a in the direction of the arrow $E_1$ in FIG. 2 against the force of the coil spring 40. With this pivoting movement of the tension regulator arm 39, the second pivotal arm 41 is pivoted about the pivot shaft 41a in the direction of the arrow F1 in FIG. 2, that is, in a direction to reduce the length component of a moment which is applied to the band connecting portion of the second pivotal arm 41, more specifically, in a direction to increase the brake torque of the brake band 42 applied to the tape supply reel holder 16 by moving the end of the brake band 42 to which the first pivotal arm 22 is connected. With this, the tape T is applied with a back tension in the play mode.

As is understood from the above description, due to the pivoting action of the first pivotal arm 22 induced by the two types of rotation of the drive gear 19, one end of the brake band 42 to which the first pivotal arm 22 is connected is moved to two positions thereby to allow the brake band 42 to apply the tape supply reel holder 16 with two types (viz., smaller and larger) of brake torque.

This means no need of using a soft brake mechanism which has been employed in the conventional reel holder brake device.

That is, under the tape loading operation, the brake torque produced by the brake band 42 is kept small to provide a soft braking to the tape T, while, upon completion of tape loading, the brake torque is increased to provide a back tension to the tape T in the play mode.

The above description will be more easily understood when referring to FIG. 5 which schematically shows the mutual connection between the tension regulator arm 39, the coil spring 40, the second pivotal arm 41 and the brake band 42.

The biasing force produced by the coil spring 40 upon completion of tape loading is denoted by $P_1$, while, the biasing force produced under a nonloading condition of the tape T is denoted by $P_2$. The tension of the brake band 42 applied to the second pivotal arm 41 upon completion of tape loading is denoted by Q1, while, the tension applied under a nonloading condition of the tape T 5 is denoted by Q2. The length component of a moment applied to the pivot shaft 39a of the tension regulator arm 39 due to the biasing force $P_1$ or $P_2$ is denoted by L. The length component of a moment applied to the pivot shaft 39a of the tension regulator arm 39 due to the tension Q1 or Q2 is denoted by $L_1$ or $L_2$. Because equations "$P_1 > P_2$, $L_1 > L_2$, $Q1 = P_1 \times L/L_1$, and $Q2 = P_2 \times L/L_2$" are established, an equation "Q1>Q2" is inevitably induced.

It is to be noted that no need of using a soft brake mechanism in the present invention means saving of the part-mounting space. Furthermore, for the same reason, there is no need of a periodic change of a brake shoe. Furthermore, due to the nature of the band brake mechanism employed in the invention, undesired radial vibration of the brake wheel is minimized.

Tape unloading operation is carried out in a manner substantially opposite to that of the above-mentioned tape loading operation.

That is, when, due to rotation of the electric motor 49 in the opposite direction (viz., unloading direction), the drive gear 19 (see FIG. 2) rotates counterclockwise, that is, in the direction of the arrow $A_2$, the follower pin 36 of the tape drawing plate 29 moves in the first cam groove 20 from the inner end $b_1$ toward the outer end $a_1$, and at the same time, the press roller 35 of the tape drawing plate 29 moves in the slot 32 from the end $b_2$ toward the other end $a_2$.

During the above operation, the follower pin 23 of the first pivotal arm 22 moves in the second cam groove 21 from the second arcuate groove portion 21b to the first arcuate groove portion 21a through the third arcuate groove portion 21c.

Accordingly, the tape drawing plate 29 is pivoted counterclockwise about the pivot shaft 29a in the direction of the arrow $D_2$ in FIG. 2, and at the same time, the tape drawing arm 28 is pivoted clockwise about the pivot shaft 28c in the direction of the arrow C2 due to the force of the torsion spring 34.

The first pivotal arm 22 is pivoted counterclockwise in FIG. 2 about the pivot shaft 22a in the direction of the arrow $B_2$. Thus, the tension regulator arm 39 is pivoted clockwise about the pivot shaft 39a in the direction of the arrow $E_2$ (that is, in the direction to reduce the length of the coil spring 40) due to the force of the coil spring 40. Due to this pivoting of the tension regulator arm 39, the arm actuating portion 45 of the arm 39 presses and thus rotates the second pivotal arm 41 clockwise about the pivot shaft $41_a$ in the direction of the arrow $F_2$, that is, in a direction to increase the length component of a moment applied to the pivot shaft 39a due to the tension applied to the band connecting portion of the second pivotal arm 41, more specifically, in a direction to decrease the brake torque of the band brake 42 applied to the tape supply real holder 16 by moving the end of the brake band 42 to which the first pivotal arm 22 is connected. With this, the tape T is applied with a back tension in the tape loading mode and/or the fast forward mode.

Figure 6:
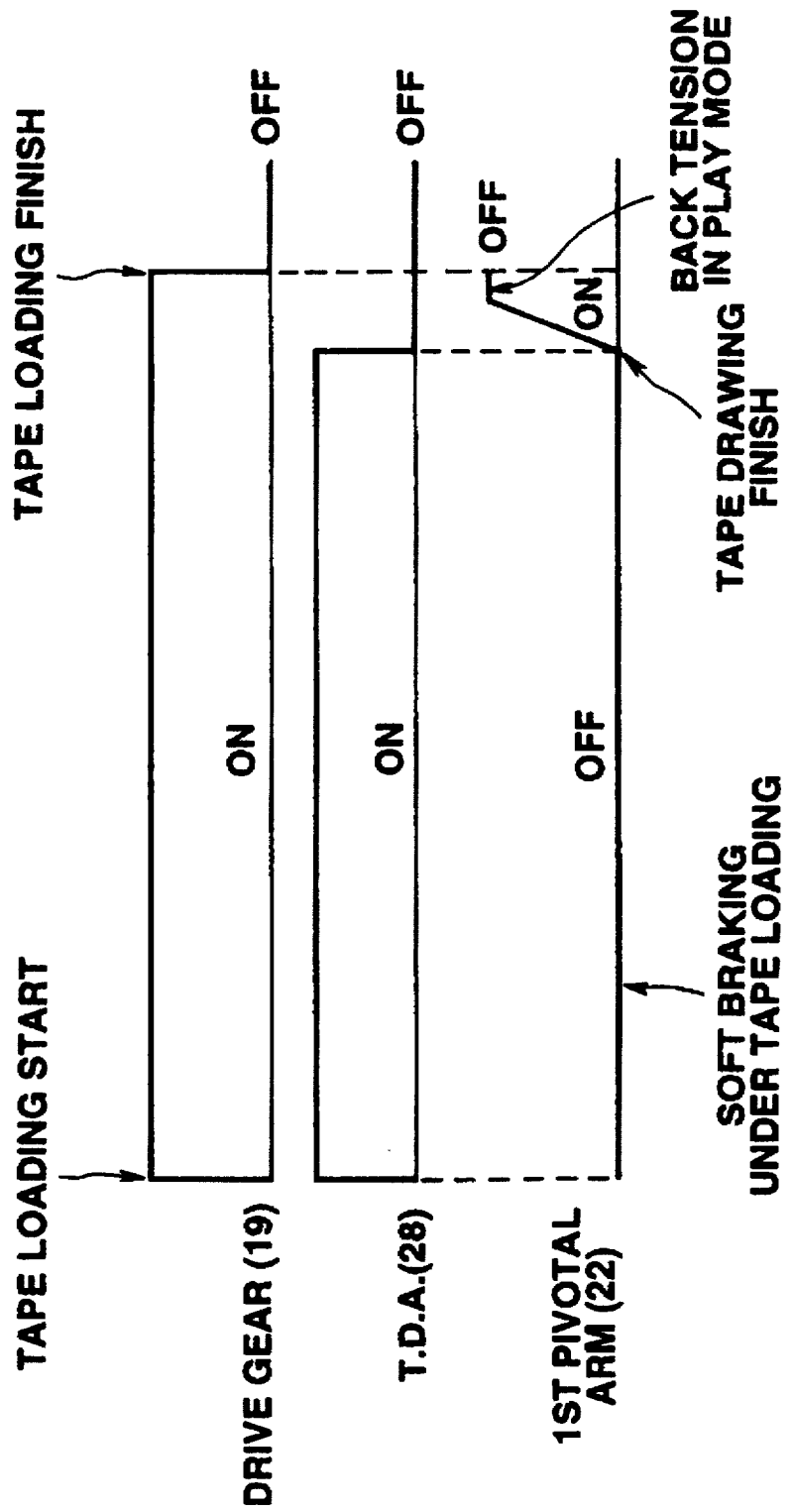
FIG. 6 is a time chart for explaining timed movements of a drive gear, a tape drawing arm and a first pivotal arm.

In the following, the operation timing of the drive gear 19, the tape drawing arm 29 and the first pivotal arm 22 in the tape loading mode will be described with reference to FIG. 6.

When the drive gear 19 starts the tape loading operation, the tape drawing arm 28 starts its tape drawing operation. As shown, the operation of the tape drawing arm 28 stops prior to the time when the operation of the drive gear 19 stops. Until the termination of operation of the tape drawing arm 28, the first pivotal arm 22 assumes one position to cause the brake band 42 to provide soft braking which is suited to the tape loading mode. While, when the operation of the tape drawing arm 28 stops, the first pivotal arm 22 is pivoted to assume the other position to cause the brake band 42 to provide the tape T with a back tension which is suited to the play mode. Upon this, the rotation of the drive gear 19 stops.

In the above-mentioned embodiment, reduction of the brake torque produced by the brake band 42 is achieved by pivoting both the first and second pivotal arms 22 and 41.

However, if desired, such brake torque reduction may be made by pivoting only the first pivotal arm 22. This modification will be described with reference to FIG. 5.

In the drawing, the biasing force produced by the coil spring 40 upon completion of the tape loading is denoted by $P_1$, while, the biasing force produced under nonloading condition of the tape T is denoted by $P_3$. The tension of the brake band 42 applied to the second pivotal arm 41 upon completion of the tape loading is denoted by Q1, while, the tension applied under the nonloading condition of the tape T is denoted by Q3. The length component of a moment applied to the pivot shaft 39a of the tension regulator arm 39 due to the biasing force $P_1$ or $P_3$ is denoted by L. The length component of a moment applied to the pivot shaft 39a of the tension regulator arm 39 due to the tension Q1 or Q3 is denoted by $L_1$ or $L_3$. Because equations "$P_1 > P_3$, $L1 = L_3$, $Q1 = P_1 \times L/L_1$, and $Q3 = P_2 \times L/L_3$" are established, an equation "$Q1 > Q_3$" is inevitably induced.

Although the above description is directed to an example applied to a video camera, the present invention can be applied to various types of magnetic recording and playback devices.

In the following, a modification of the reel holder brake device will be described.

That is, the modified device comprises a reel holder which holds a tape reel, a brake band which has a major part put around the reel holder and a tension regulator mechanism which has a tension regulator arm pivotally movable from an initial position to a loading position against the biasing force of a spring. Between a pivoted portion of the tension regulator arm and a spring engaging portion, there is arranged a pivotal arm which is pivotally connected to the tension regulator arm. One of ends of the brake band is connected to the pivotal arm. The tension regulator arm is formed with an arm actuating portion by which the pivotal arm is pressed in a direction to move, in a tape unloading condition, the band connecting portion of the pivotal arm away from the pivoted portion of the regulator arm.

In this modified reel holder brake device, the length component of a moment applied to the pivoted portion of the regulator arm due to the tension of the brake band applied to the band connecting portion of the pivotal arm is increased. Thus, the brake torque produced on the reel holder by the brake band due to movement of the band connecting portion of the pivotal arm can have two (viz., smaller and larger) types.

This means no need of using a soft brake mechanism which has been used in the conventional reel holder brake device.

No need of using a soft brake mechanism brings about saving of the part-mounting space. Furthermore, for the same reason, there is no need of a periodic change of a brake shoe. Furthermore, due to the nature of the band brake mechanism employed in the invention, undesired radial vibration of the brake wheel is minimized.

What is claimed is:

1. A reel holder brake device for use in a tape driving system having both a tape reel holder having mounted thereon a tape reel and a tape drawing arm which leads a part of a tape from the tape reel to a given portion of the device comprising:

a brake band having a first end and a second end and having a major portion thereof operatively arranged around said reel holder;

a tension regulator arm pivotal about a pivoted portion thereof between a loading position and an unloading position, said tension regulator arm having said pivoted portion thereon;

biasing means for biasing said tension regulator arm to pivot toward the unloading position;

a drive gear for driving said tape drawing arm when rotated, said drive gear having formed in one surface thereof a cam groove;

a first pivotal arm having a first end and a second end, wherein said first end is pivotally connected to said first end of said brake band and said second end is equipped with a follower pin and is slidably engaged with said cam groove; and a second pivotal arm having a first end and a second end, wherein said first end is pivotally connected to said tension regulator arm and said second end is pivotally connected to said second end of said brake band.

2. A reel holder brake device as claimed in claim 1, in which said cam groove of said drive gear is so constructed so as to pivot said first pivotal arm when rotated.

3. A reel holder brake device as claimed in claim 2, in which said first pivotal arm is in the shape of a letter L and having a first arm part and a second arm part, wherein said first arm part has a leading end equipped with a follower pin, and said second arm part has a leading end pivotally connected to said first end of the brake band, and said first pivotal arm further having a pivoted portion which integrally connects said first and second arm parts.

4. A reel holder brake device as claimed in claim 3, further comprising a position adjusting plate mounted on said first pivotal arm to adjust a distance between said leading end of said second arm part of said first pivotal arm and said first end of said band brake.

5. A reel holder brake device as claimed in claim 4, in which said position adjusting plate is detachably mounted on said second arm part of the first pivotal arm through a fastening screw.

6. A reel holder brake device as claimed in claim 5, in which said position adjusting plate has an end pivotal about a pivot axis of said pivoted portion of said first pivotal arm.

7. A reel holder brake device as claimed in claim 6, further comprising stopper means for limiting a mutual displacement between said position adjusting plate and said second arm part of said first pivotal arm.

8. A reel holder brake device as claimed in claim 7, in which said stopper means comprises:

a stopper pin fixed to said second arm part of said first pivotal arm; and means defining an arcuate slot formed in said position adjusting plate, said arcuate slot receiving said stopper pin.

9. A reel holder brake device as claimed in claim 1, in which said tension regulator arm is formed with an arm actuating portion, said arm actuating portion being so constructed as to push said second pivotal arm in such a direction as to increase a distance between said second end of the brake band and said pivoted portion of said tension regulator arm.

10. A reel holder brake device comprising:

a reel holder for receiving a tape reel to rotate therewith;

a tension regulator mechanism including a brake band having a major portion thereof arranged around the circumference of said reel holder and a tension regulator arm which is pivotal from an initial portion to a loading position against a biasing force of a spring connected at a point on said tension regulator arm;

a drive gear for driving a tape drawing arm for leading said tape onto a given portion of said tension regulator arm;

means defining a cam groove in one surface of said drive gear;

a first pivotal arm having a first end and a second end, said first end thereof having a pin slidably engaged with said cam groove; and a second pivotal arm pivotally connected to said tension regulator arm at a position adjacent said point whereat said spring is connected, said second pivotal arm being connected to said second end of said first pivotal arm through said brake band.

11. A reel holder brake device as claimed in claim 10, in which said cam groove is so constructed as to pivot said first pivot arm between two positions upon rotation of said drive gear.

12. A reel holder brake device as claimed in claim 10, in which said tension regulator arm is formed with an arm actuating portion, said arm actuating portion being so constructed as to push, under a tape nonloading condition, said second pivotal arm in such a direction as to increase the distance between a band connecting portion of said second pivotal arm and a pivoted portion of said tension regulator arm.

13. A reel holder brake device comprising:

a reel holder for receiving a tape reel to rotate therewith;

a tension regulator mechanism including a brake band having a major portion arranged around the circumference of said reel holder and a tension regulator arm being pivotally mounted at a location thereon for pivotal movement an initial position to a loading position against a biasing force of a spring;

a pivotal arm having a first end and a second end and being pivotally connected at said first end to said tension regulator arm at a point between said pivotally mounted location of said tension regulator arm and a spring engaging portion, said pivotal arm having said second end connected to one end of said brake band; and an arm actuating portion formed on said tension regulator arm for pushing, under a given condition, said pivotal arm so that said pivotal arm pivots at said first end thereof in such a direction as to increase the distance between said second end of said pivotal arm connected to one end of said brake band and said pivotally mounted location of said tension regulator arm.

* * * * *